United States Patent
Kunkel

(10) Patent No.: US 7,483,527 B2
(45) Date of Patent: Jan. 27, 2009

(54) METHOD FOR OPERATING A CALL-CENTRE

(75) Inventor: Helmut Kunkel, Worms (DE)

(73) Assignee: T-Mobile Deutschland GmbH, Bonn (DE)

(*) Notice: Subject to any disclaimer, the term of this patent is extended or adjusted under 35 U.S.C. 154(b) by 405 days.

(21) Appl. No.: 10/507,102

(22) PCT Filed: Mar. 12, 2003

(86) PCT No.: PCT/DE03/00802

§ 371 (c)(1),
(2), (4) Date: Apr. 11, 2005

(87) PCT Pub. No.: WO03/077519

PCT Pub. Date: Sep. 18, 2003

(65) Prior Publication Data

US 2006/0018456 A1    Jan. 26, 2006

(30) Foreign Application Priority Data

Mar. 12, 2002 (DE) .............................. 102 10 791

(51) Int. Cl.
*H04M 3/00* (2006.01)
*H04M 5/00* (2006.01)
(52) U.S. Cl. .................. 379/265.02; 379/265.01
(58) Field of Classification Search ............ 379/265.02, 379/265.03–14, 266
See application file for complete search history.

(56) References Cited

U.S. PATENT DOCUMENTS

| | | | | |
|---|---|---|---|---|
| 5,181,236 A | * | 1/1993 | LaVallee et al. | 379/88.22 |
| 5,511,112 A | * | 4/1996 | Szlam | 379/266.06 |
| 6,542,602 B1 | * | 4/2003 | Elazar | 379/265.06 |
| 7,006,607 B2 | * | 2/2006 | Garcia | 379/88.18 |

FOREIGN PATENT DOCUMENTS

| | | |
|---|---|---|
| EP | 0515068 A2 | 11/1992 |
| EP | 1069750 A2 | 1/2001 |

* cited by examiner

*Primary Examiner*—William J Deane
(74) *Attorney, Agent, or Firm*—Browdy and Neimark, P.L.L.C.

(57) ABSTRACT

In a call-centre, external telephone calls form customers are distributed to terminals so that they can be answered by agents. The invention relates to a method for operating a call-centre, wherein an external call is initially connected to a free terminal. If an interruption in the conversation occurs, a message recorded by the agent is stored and the connection is allocated automatically. The call is transferred to a separate waiting line. The caller can initialise a new connection to a free terminal i.e. to the same terminal or to a different agent. During the new connection, the message belonging to the waiting connection is automatically played back, whereby the interrupted conversation with the client can be continued in a problem free manner. The inventive method increases the productivity of the call-centres without changing the high level of service.

5 Claims, 3 Drawing Sheets

METHOD FOR OPERATING A CALL-CENTRE

FIELD

The invention is concerned with a method for operating a call center.

BACKGROUND

In a call center, incoming external telephone calls are sorted by an automatic call distribution (ACD) system according to certain criteria and automatically distributed to the terminals of the employees—so-called call center agents. If all terminals are busy with voice connections to external callers, the capacity of the call center is exhausted; additional calls can then no longer be answered in person but only with the aid of an interactive voice response (IVR) system.

The efficiency and quality of a call center can be measured based on the number of processed calls, as well as by the ability to reach the agents (so-called service level). It is obvious that the ability to reach an employee is inversely proportional to the duration of a telephonic customer contact. Particularly detrimental to the productivity of the employees and, hence, to the efficiency of a call center, are telephone calls, during which the external caller forces the call center agents to wait and be idle. Reasons for such forced pauses in a telephone call may be, for example, a search for documents or an internal consultation with a person in the background.

In practice, the problem often arises in this context, that the external caller ignores the call center agent's polite request to please call back after the document in question has been located or after a decision has been made, and abruptly turns away with the comment that the agent should please hold on for a moment. The agent is now in a difficult position: he is unable to estimate how long the interruption caused by the external caller will last, and whether a completion of the request presented to him will afterwards be possible at all.

Under the aspects of the highest possible service level on one hand and the personal pressure of needing to process as many calls as possible on the other hand, a nearly unsolvable conflict of objectives results for the call center agent: if he terminates the connection to the external caller after a certain amount of time spent waiting, he can spend this time saved with another caller, resulting in an increased productivity of the employee. On the other hand, the customer-friendly attitude that is expected of him, forces him to idly wait for the call to be resumed by the external caller, although he can neither foresee how long this will take, nor whether the call can be continued at all and if so, whether it can be concluded with a positive outcome.

SUMMARY

In EP 0 515 068 A1, a method for operating a call center is revealed, wherein incoming external telephone calls are automatically distributed to terminals to be answered by call center agents. An external call is connected to a free terminal of an agent. If a waiting time of expected longer duration occurs for the agent, the agent can have the call handled automatically in the meantime. For this purpose the agent speaks the caller's name into a recording system. The spoken name is saved and used, together with an automated voice announcement for the caller, which is played for the caller. The message recorded by the agent is thus intended to provide information to the caller and not for the agents. If the caller desires a renewed personal consultation, a connection to a free terminal of an agent is again established. The described process makes it possible to increase the productivity of the agents and increase the customer satisfaction.

The problem thus presents itself how to operate a call center in such a way that the described conflict of objectives between a high level of productivity of the employees on one hand and a high degree of customer satisfaction on the other hand is solved. It is, therefore, the object of the present invention to create a process whereby a call center can be operated more effectively.

This object is met with the process described in claim 1. Accordingly, an external call is first connected in a usual manner per se to a free terminal of an agent. If an acoustic pause occurs, the length of which either the agent no longer wants to tolerate or which is no longer accepted by the call center system, the call is forwarded to a separate hold line, initiated either manually or automatically. At the same time or shortly before, a message from the agent regarding the interrupted call is stored. This message is automatically assigned to the held connection. If the external caller, after a certain amount of time, is ready to continue the call, the call that has been held for this duration is again connected to a free terminal, so that a voice connection is again established with an agent. The previously stored message is now played back. The agent, who was able deal with one or more other callers during the break in the call is informed through the automatically assigned message, which is played back at exactly the right moment, of the basic content of the call prior to the break in the call, so that processing of the external caller's request can be resumed quickly and effectively without repeating the first part of the call.

The inventive process allows interruptions of a customer call that are caused by the customer himself to be used for other productive work without the external caller feeling that he was turned away with his request or even treated impolitely. A particular advantage of the proposed process consists of the fact that the interruption caused by the external caller can last for any length of time without a call center agent being kept tied up during this time. The storing and automatic assignment of a message to the existing connection ensures a quick continuation of the interrupted call that is pleasant for both parties. The above conflict of objectives for the agent is prevented, whereby the call center's productivity is increased while simultaneously providing for an increased availability.

The message from the agent is preferably stored as a spoken audio file and later played back acoustically. In this context it has proven particularly advantageous if the stored message is played back automatically immediately prior to establishing the renewed connection to the terminal of a free agent. In this context it is practical, of course, that playback of the message is audible only for the agent but not for the external caller.

In an improvement of the inventive process, the separate hold line has an interactive voice response (IVR) system. This enables the external caller, who was transferred to the separate hold line, to initialize the continuation of the personal call with an agent at any time. The external caller thus determines himself how long his call will be held and how long the interruption will last.

A big advantage of the inventive process also consists of the fact that the external call is initially answered by a first call center agent and can later, after initialization of the renewed connection by the external caller, be continued by another, second agent who is free at the time. Especially if the external call is initially connected to a first terminal of a first agent, and the held connection, after ending the break in the call, is then forwarded to a second terminal of a second agent, the automatically assigned message from the first agent is an invaluable help for the second agent. The external caller will be astonished and pleased to hear that the new party he is talking to also has knowledge of the first portion of the call and can thus seamlessly continue to process his request. Of course, the stored message is also helpful in the case in which the system forwards the interrupted, but held, call back to the same terminal of the agent who had already answered the call.

BRIEF DESCRIPTION OF THE DRAWINGS

The proposed process and the advantages that are associated with it will be explained in more detail below with the aid of the appended drawings, in which.

DETAILED DESCRIPTION

All figures show a schematic representation of the time progression of a customer contact, and above it the corresponding duration of the time a call center agent (or agents) is tied up.

Figure 1:
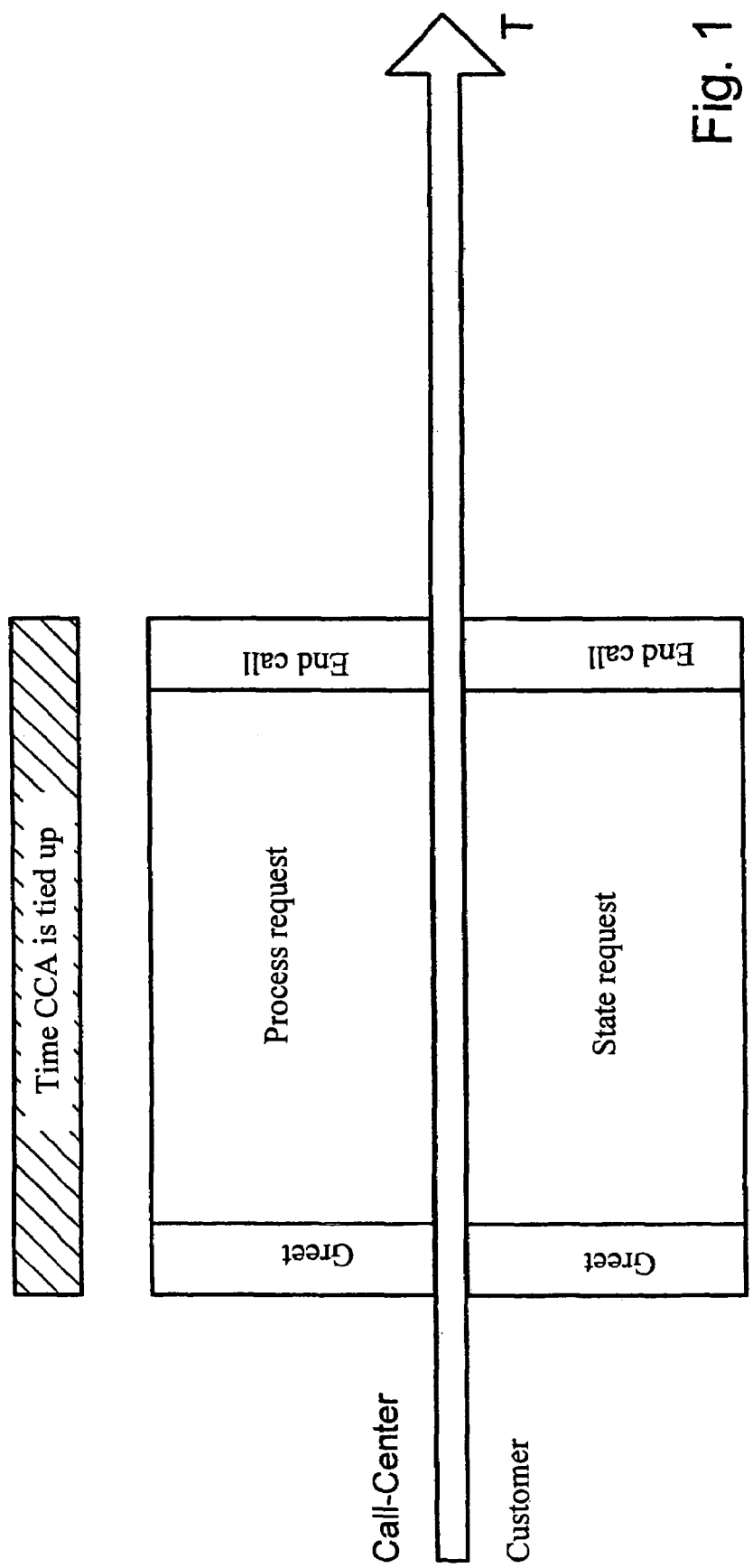
FIG. 1 shows the ideal case of a customer call that is completed without interruption.

In the ideal case shown in FIG. 1, the external caller's (customer's) request can be processed without interruption. The time during which the call center agent (CCA) is tied up with the customer contact is filled almost exclusively with productive work.

Figure 2:
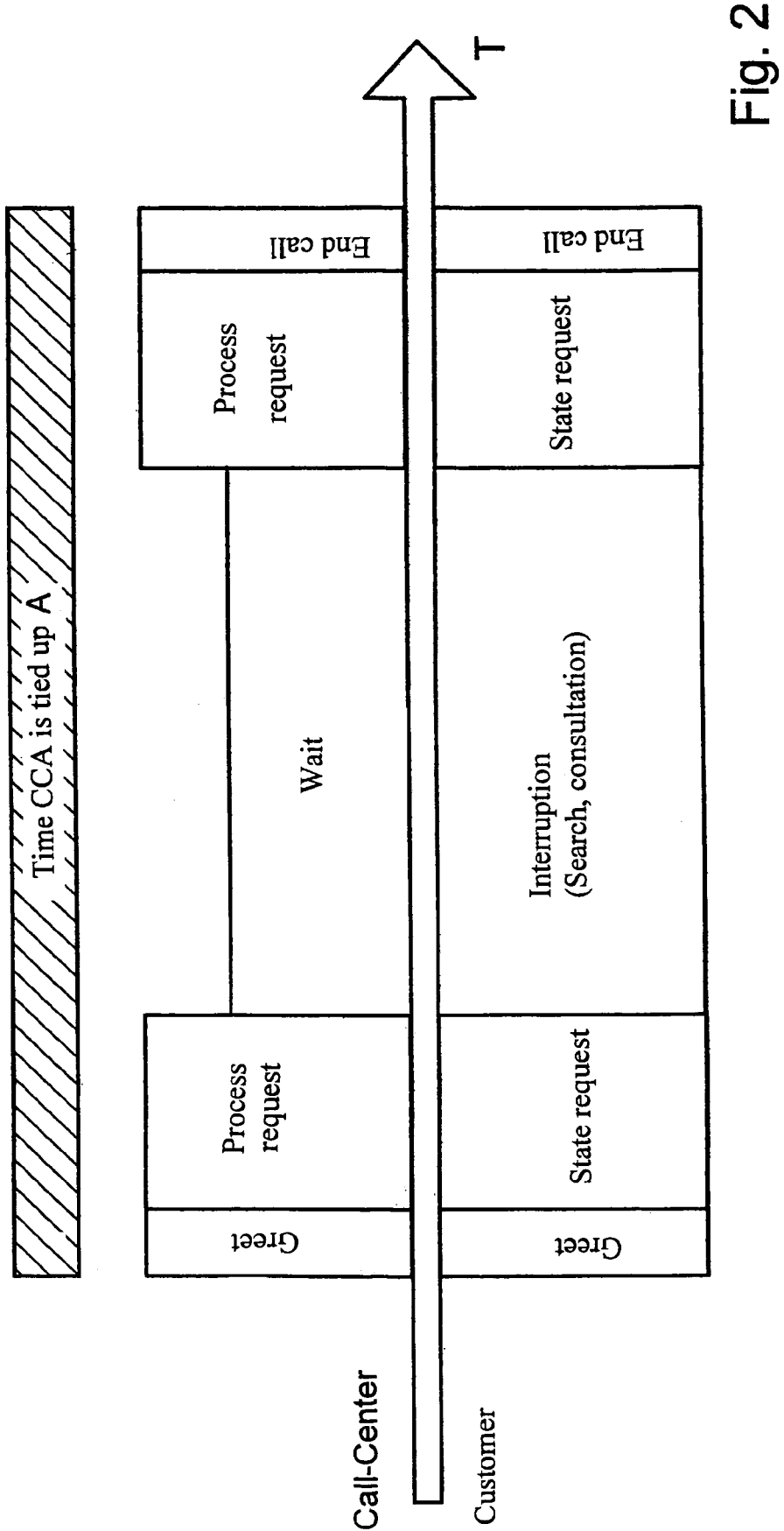
FIG. 2 shows the problems that are associated with an interruption in the customer call.

In the problem case shown in FIG. 2, an interruption in the call occurs, for example because the customer is searching for identification data or consults with a person in the background. During this interruption in the call, the call center agent (CCA) continues to remain tied up, however, his productivity is zero. Particularly unsatisfactory, from the point of view of the call center, is the fact that the loss in productivity is caused exclusively by the customer and the duration of the interruption is neither foreseeable nor can it be influenced, unless the customer contact is completely terminated, which would then, in turn, irritate the customer.

Figure 3:
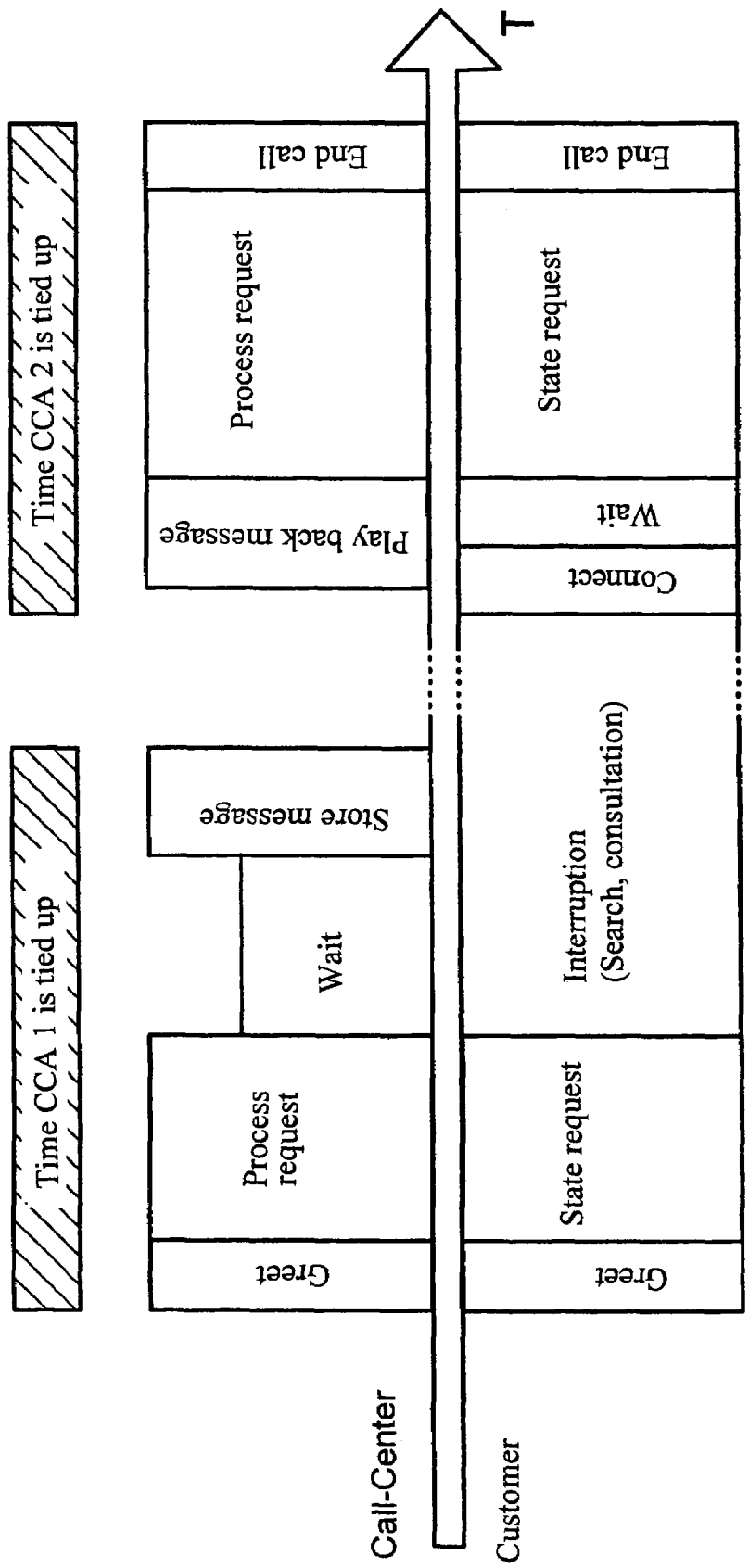
FIG. 3 shows the course of a customer call with the use of the inventive process.

In the course of a customer contact shown in FIG. 3, the external call from the customer is initially processed by a first call center agent (CCA 1). If a break in the call occurs by the customer, the agent, at his discretion, first waits for a certain length of time that appears reasonable to him. The maximum permissible duration of the pause is pre-set by the system. If the caller does not return to the line by a certain point in time, the call is forwarded to a separate hold line. At the same time the agent speaks a message, which is saved as an audio file and automatically assigned to the existing connection. When the customer is ready to talk again, he can initiate a new connection with a call center agent by means of the interactive voice response system. In the present example the renewed connection is established to a second terminal of a second call center agent (CCA 2). Immediately prior to the renewed establishing of a voice connection with the customer, playback of the message that is assigned to the held connection takes place automatically. The second call center agent (CCA 2), can individually and personally greet the customer, who had to wait for only a very short period of time, and seamlessly continue the call at the point where his colleague (CCA 1) had to leave off earlier.

The increase in productivity that is attainable with the use of the process is illustrated in a comparison of the course of the calls in FIGS. 2 and 3: while the call center agent (CCA 1) remains tied up in the course of the call in FIG. 2 also during the interruption, the length of time the first call center agent (CCA 1) remains tied up during the course of the call illustrated in FIG. 3 is limited to the time prior to forwarding the call to the hold line, and the amount of time the second call center agent (CCA 2) is tied up is limited to the time after the renewed connection of the held call. The sum of the amounts of time that both agents are tied up altogether is only insignificantly higher than in the ideal case explained with the aid of FIG. 1 of a customer contact without any interruption.

What is claimed is:

1. A method for operating a call center, wherein incoming external telephone calls by callers are automatically distributed to terminals to be answered by call center agents, comprising the process steps:

connecting an external call to a free terminal of an agent;

forwarding the call to a separate hold line, if an acoustic pause occurs, the length of which either the agent no longer wants to tolerate or which is no longer accepted by the call center system;

storing a message created by the agent concerning content of the call between the caller and the agent at the same time or shortly before the call is forwarded;

automatically assigning the stored message to the existing connection;

renewing connection of the held call to a free terminal of an agent after the caller is ready to continue the call; and playing the stored message assigned to the held connection at the agent's terminal in such a way that the message is audible only for the agent.

2. The process of claim 1, wherein the step of storing comprises saving the agent's message as an audio file, and the step of playing comprises playing the stored message back acoustically.

3. The process of claim 1 or 2, wherein the stored message is played back automatically immediately prior to establishing the renewed connection to a terminal.

4. The process of claim 1 or 2, wherein the separate hold line is connected to an interactive voice response, so that the renewed connection to a terminal can be initialized by the external caller.

5. The process of claim 1 or 2, wherein the external call is initially connected to a first terminal of a first agent and the held connection is transferred from the hold line to a second terminal of a second agent.

* * * * *